(12) United States Patent
Beiu

(10) Patent No.: US 6,502,120 B2
(45) Date of Patent: Dec. 31, 2002

(54) ADDER CIRCUIT EMPLOYING LOGIC GATES HAVING DISCRETE WEIGHTED INPUTS AND A METHOD OF OPERATION THEREWITH

(75) Inventor: Valeriu Beiu, Dallas, TX (US)

(73) Assignee: RN2R, LLC, Dallas, TX (US)

( * ) Notice: Subject to any disclaimer, the term of this patent is extended or adjusted under 35 U.S.C. 154(b) by 0 days.

(21) Appl. No.: 09/757,978

(22) Filed: Jan. 10, 2001

(65) Prior Publication Data

US 2001/0001861 A1 May 24, 2001

Related U.S. Application Data

(62) Division of application No. 09/158,947, filed on Sep. 21, 1998, now Pat. No. 6,205,458.

(51) Int. Cl.[7] .................................................. G06F 7/50
(52) U.S. Cl. ...................................... 708/675; 708/706
(58) Field of Search ................................ 708/675, 706, 708/700

(56) References Cited

U.S. PATENT DOCUMENTS

| | | | | | |
|---|---|---|---|---|---|
| 3,280,316 | A | * | 10/1966 | Jeeves | 708/675 |
| 3,423,577 | A | * | 1/1969 | Cohn | 708/675 |
| 3,609,329 | A | * | 9/1971 | Martin | 708/675 |
| 4,140,920 | A | * | 2/1979 | Dao et al. | 708/675 |

OTHER PUBLICATIONS

Cohen et al "Threshold Gate Building Blocks" Sep. 1969 IEEE Transactions of Computers pp. 316–323.*

Fischler et al "Threshold Realization of Arithmetic Circuits" Apr. 1962 IRE Transactions on Electronic Computers pp. 287–288*

* cited by examiner

Primary Examiner—David H. Malzahn

(57) ABSTRACT

A circuit and method for deriving an adder output bit from adder input bits. In one embodiment, the circuit includes: (1) first, second and third threshold logic gates that generate intermediate bits based on threshold comparisons of concatenations of ones of the adder input bits and (2) combinatorial boolean logic that generates the adder output bit from the intermediate bits.

24 Claims, 5 Drawing Sheets

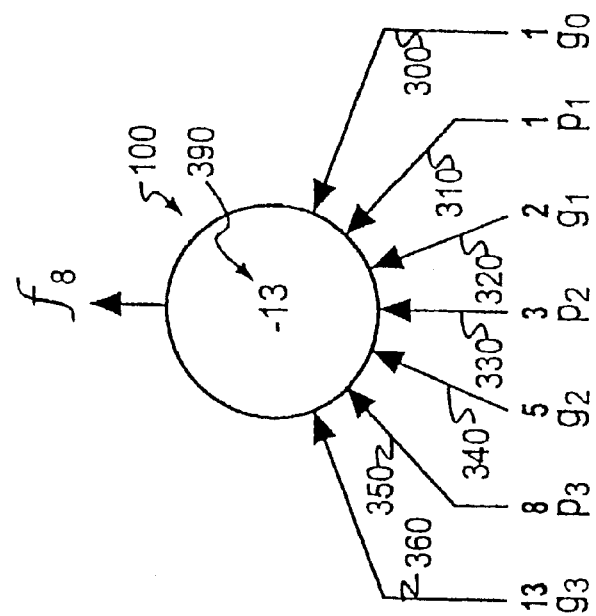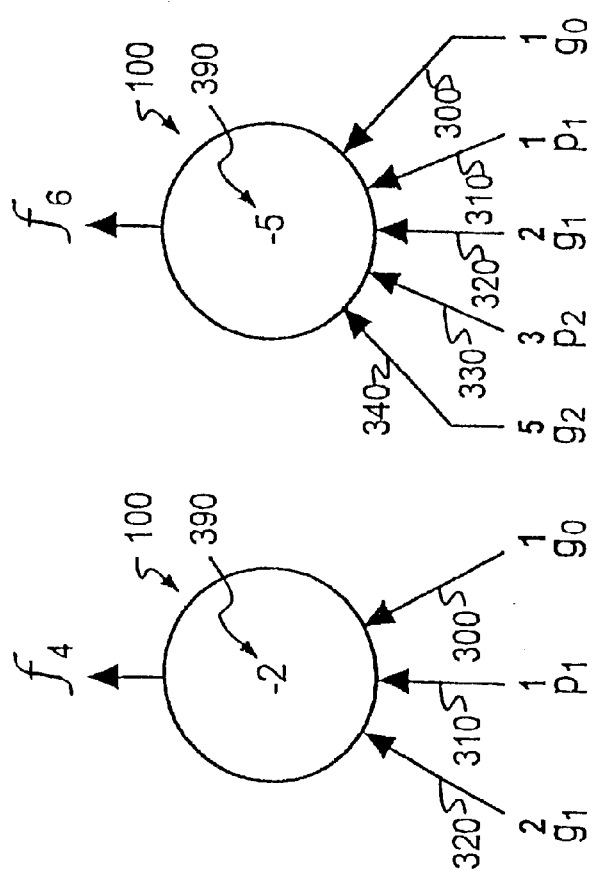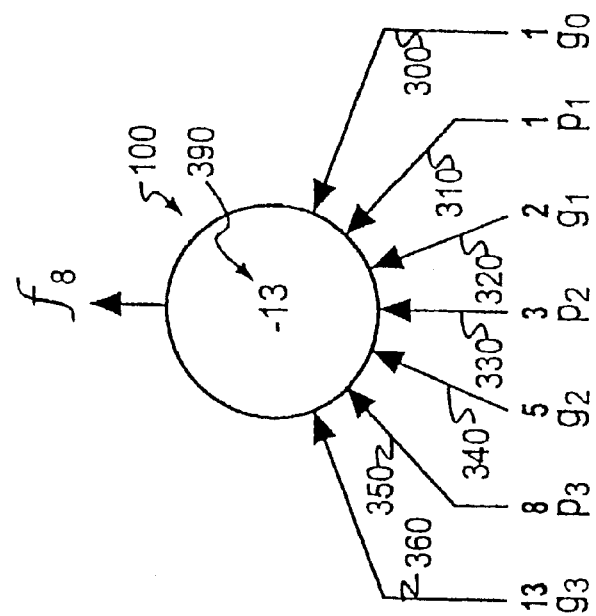

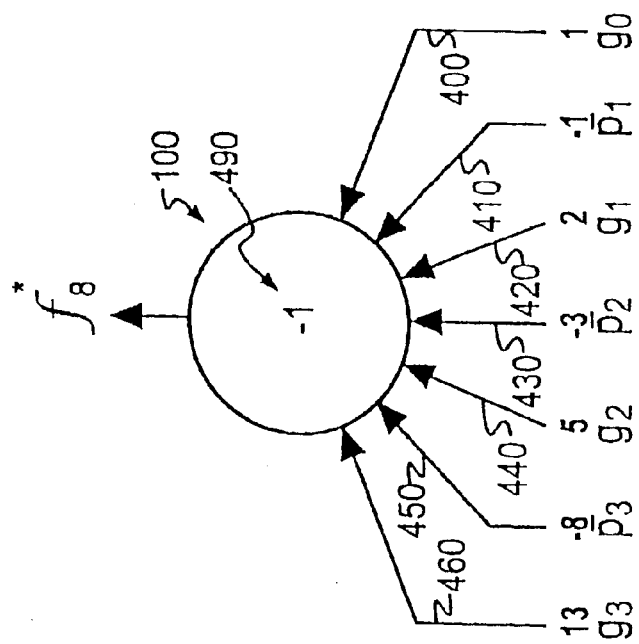
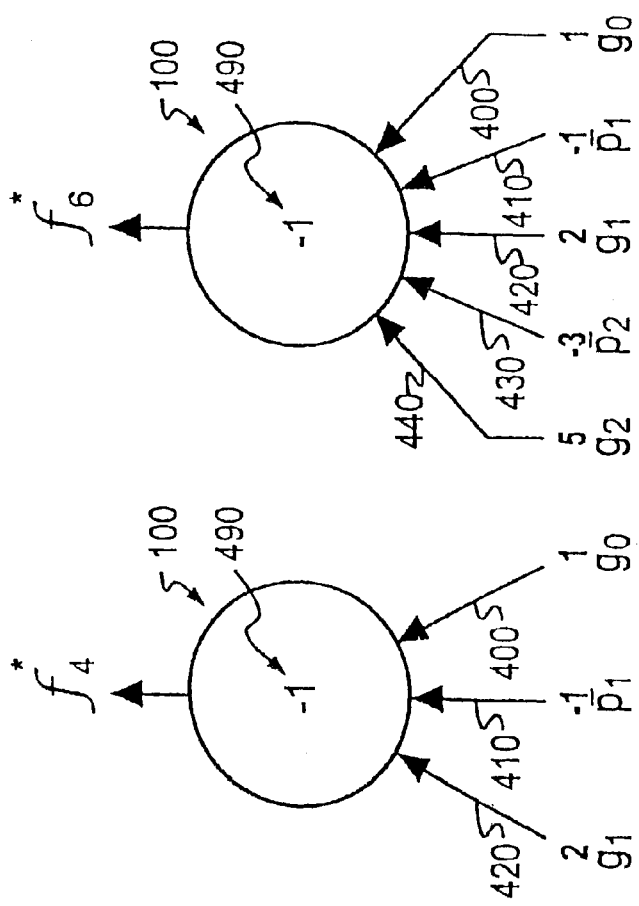
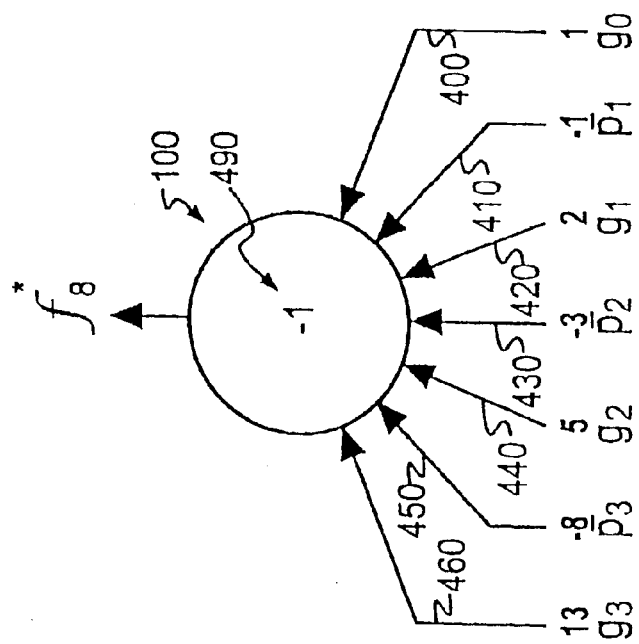
Figure 4A
Figure 4B
Figure 4C

ADDER CIRCUIT EMPLOYING LOGIC GATES HAVING DISCRETE WEIGHTED INPUTS AND A METHOD OF OPERATION THEREWITH

This application is a Divisional of prior application Ser. No. 09/158,947, filed on Sep. 21, 1998, now U.S. Pat. No. 6,205,458, to Valeriu Beiu, entitled "ADDER AND MULTIPLIER CIRCUITS EMPLOYING LOGIC GATES HAVING DISCRETE, WEIGHTED INPUTS AND METHODS OF PERFORMING COMBINATORIAL OPERATIONS THEREWITH." The above-listed Application is commonly assigned with the present invention and is incorporated herein by reference as if reproduced herein in its entirety under Rule 1.53(b).

TECHNICAL FIELD OF THE INVENTION

The present invention is directed, in general, to adder and multiplier circuits and, more specifically, to adder and multiplier circuits employing logic gates having discrete, weighted inputs, combinations of the same, methods of performing combinatorial operations with such logic gates and combinations thereof.

BACKGROUND OF THE INVENTION

Digital systems are used extensively in computation and data processing, controls, communications and measurement. Digital systems use digital signals that may only assume discrete values. Typically, digital systems use binary signals that employ only two values. Since such systems only use two distinct values, errors caused by component variations are minimized. As a result, a digital system may be designed such that, for a given input, an output thereof is exactly correct and repeatable. This gives rise to the extreme accuracy for which digital systems are well known.

Analog systems, on the other hand, use analog signals that vary continuously over a specified range. Analog systems are thus particularly vulnerable to error, depending on the accuracy of the components used therein. Since digital systems are generally capable of greater accuracy and reliability than analog systems, many tasks formerly performed by analog systems are now performed exclusively by digital systems.

A digital system, such as a computer, typically includes an input device, an output device, a processor or central processing unit (CPU) and a data storage device (e.g., random access memory or hard disk). A CPU typically contains an arithmetic/logic unit (ALU) that performs arithmetic functions (e.g., add, subtract, multiply and divide) and logic functions (e.g., AND, OR and NOT). Additionally, a CPU may also contain a floating point unit (FPU) that performs floating point operations (e.g., add, subtract, multiply and divide).

One basic building block of digital systems is a logic gate. Conventional logic gates have one output and one or more inputs. The number of inputs is called the "fan-in" of the gate. The state of the output is completely determined by the state(s) of the input(s).

Logical and arithmetic functions are typically performed by a number of logic gates coupled together to form a multi-layer network. The maximum number of gates cascaded in series between the input and the output of such a network is typically referred to as the number of layers of gates. Designers are concerned with the number of layers in a network for several reasons. In some applications, increasing the number of layers may reduce the required number of gates and gate inputs (i.e., fan-in), thus reducing the cost (which may be expressed in terms of integrated circuit area) of building the network. Of course, cascading a large number of gates together may result in unacceptable input-output delays and data dependency conditions. When the input of a gate is switched, a finite time elapses before the output of the gate changes. If a large number of gates are cascaded together to form a network, the time between an input change and a corresponding change in the network output may become excessive, thereby slowing down the operation of the network.

Arithmetic functions are particularly susceptible to the effects of cascaded gates. The serial solution for binary addition is given here as an example. Initially, a first augend bit and a first addend bit are added together, to produce a first sum bit and a first carry bit. The first carry bit is then added to the second augend and addend bits to produce the second sum and carry bits. Since the second sum bit is dependent on the value of the first carry bit, the second sum bit cannot be computed before the first carry bit is computed. While each input-output delay is small, the cumulative input-output delay perceived when adding large numbers, due to the propagation of the carry bit, is proportional to the number of bits added, and may be prohibitive. Techniques (e.g., carry look-ahead, conditional sum or prefix computation have been developed for reducing the delay to a logarithmic function of the number of input bits to be added. The number of Boolean gates (e.g., AND, OR or NOT) used by such techniques is in the range of from 8 n to 35 n or 2 n log(n) to 3 n log(n), where n is the number of bits to be added and the logarithms are base two.

Increasing processing power is a continuing goal in the development of microprocessors. Microprocessor designers are generally familiar with three ways to increase the processing power of a CPU. The CPU's clock frequency may be increased so that the CPU can perform a greater number of operations in a given time period. Microprocessors are designed to operate at increasingly high clock frequencies. For instance, the 8080 (introduced in 1974 by the Intel Corporation) was designed to operate at about 2 to 3 MHZ. Today, Intel's Pentium II line of processors are designed to operate with clock frequencies over 300 MHZ. While a higher clock frequency generally results in increased processing power, the higher clock frequency also increases power dissipation, resulting in higher device operating temperatures. Microprocessor designers, therefore, must address these additional problems to avoid catastrophic device failures.

Another way to increase processing power is to increase input and output data bus width, thereby allowing the CPU to process a greater amount of code and data. Early microprocessors were packaged using dual in-line packaging (DIP) technology. Increasing the width of the data buses was both expensive and unrealistic, often resulting in extremely large device packages. Today, with the use of pin grid array (PGA) packaging, increasing the size of the data buses no longer poses a packaging problem. Of course, a larger number of transistors is required to process the additional information conveyed by the wider data buses.

Yet another way to increase processing power is to change the internal architecture of the microprocessor to overlap the execution of instructions by, for example, superscaling. This method also requires the addition of a large number of transistors, since entire processing stages or execution units must be duplicated. Performing a large number of instructions in parallel may also result in data dependency problems.

Accordingly, what is needed in the art is new architectures for addition circuitry, multiplication circuitry and combinations of the same that increase the processing power of conventional digital systems.

SUMMARY OF THE INVENTION

To address the above-discussed deficiencies of the prior art, the present invention provides a circuit and method for deriving an adder output bit (such as a carry out bit, a carry-generate bit or a carry-propagate bit) from adder input bits (such as a carry in bit, (at least) first and second addend and augend bits, (at least) first and second carry-generate bits or (at least) first and second carry-propagate bits. The present invention further provides a multiplier circuit, a method of multiplying, a microprocessor and digital signal processor (DSP) employing the circuit or the method and a method of generating weights for logic gates.

In one embodiment, the circuit includes: (1) first, second and third logic gates that generate intermediate bits based on threshold comparisons of concatenations of ones of the adder input bits and (2) combinatorial logic that generates the adder output bit from the intermediate bits. Circuits may be coupled to one another in layers to yield a wider adder. In such configuration, addend and augend bits are transformed into carry-generate and carry-propagate bits, which are ultimately transformed into a carry out bit.

The present invention introduces novel digital addition and multiplication circuits that take advantage of multiple discrete logic levels to perform respective addition and multiplication operations significantly faster than prior art adders and multipliers. Of course, the principles of the present invention extend to cover logic gates that process more than two adder input bits concurrently.

In one embodiment of the present invention, the first logic gate generates a first intermediate bit based on a comparison between a concatenation of ones of the adder input bits and zero. In a related embodiment of the present invention, the second logic gate generates a second intermediate bit based on a comparison between a concatenation of ones of the adder input bits and two. In another related embodiment of the present invention, the third logic gate generates a third intermediate bit based on a comparison between a concatenation of ones of the adder input bits and four.

The first, second and third logic gates cooperate to provide the correct intermediate bits to the combinatorial circuitry based on the values of the various adder input bits.

In one embodiment of the present invention, the combinatorial logic comprises first, second and third AND gates and first and second OR gates coupled to outputs thereof. In an embodiment of the invention to be illustrated and described, the combinatorial logic generates the adder output bit by additionally employing the ones of the adder input bits.

In one embodiment of the present invention, each of the first, second and third logic gates includes: (1) a summer, having at least two binary inputs with corresponding discrete weights, that generates a weighted sum of input binary digits presented at the at least two binary inputs and (2) a quantizer, coupled to the summer, that generates an output binary digit at a binary output thereof that is a function of the weighted sum. In this embodiment, the logic gates employ an internal representation having more than two logic levels to perform combinatorial operations, but nonetheless have purely binary inputs and outputs. The binary inputs and outputs ensure that the logic gates can be employed in an otherwise conventional binary digital architecture without requiring the architecture to be modified apart from insertion of the logic gates or circuits that employ the logic gates in combination with more conventional gates, e.g., Boolean gates.

In one embodiment of the present invention, the discrete weights are integer multiples of a predetermined number. The predetermined number may be "1," allowing the discrete weights to assume integer values. Of course, the predetermined number may be any suitable number.

In one embodiment of the present invention, each of the at least two binary inputs includes: (1) a current source capable of producing a substantially constant electrical current corresponding to a particular discrete weight and (2) a switch, coupled to the current source, that switches the electrical current as a function of a corresponding particular input binary digit. The current source may be derived from a voltage source by way of a resistance. The voltage source may be provided by a power supply that provides power to other logic circuitry (such as other microprocessor circuitry) that may surround, and interact with, the logic gate. For purposes of the present invention, "substantially constant electrical current" is defined to be sufficiently constant such that the accuracy of the logic gate is not adversely affected. The level of precision required of the current is or can be a function of the range of discrete integer weights employed in the logic gate.

In one embodiment of the present invention, the circuit further includes a threshold input that provides a threshold number to the quantizer, the output binary digit being a function of a relationship between the weighted sum and the threshold number. The threshold number provides a bias to the quantizer, allowing a threshold between the binary output states to assume a value other than zero. In an embodiment to be illustrated and described, the discrete weights are advantageously selected to minimize (ideally to zero) the threshold number. This has the advantage of minimizing the number or size of current sources or sinks and thus potentially reducing the area (and therefore the cost) of the logic gate.

In one embodiment of the present invention, the corresponding discrete weights are provided by a selected one of: (1) current sources and (2) current sinks. The current sources may be made to correspond to positive discrete weights and the current sinks may be made to correspond to negative discrete weights, such that currents are added and subtracted in the summer to obtain the desired weighted sum. In this way, the logic gates of the present invention can be adapted to operate with respect to discrete weights of either positive or negative sign or a combination thereof.

In one embodiment of the present invention, the minimum integer weights and thresholds determining the threshold gates of arbitrary fan-ins able to compute the group carry-generate bit from multiple carry-generate and carry-propagate bits are also presented together with the method of determining them for gates of arbitrary fan-ins (larger than two).

In one embodiment of the present invention, the circuit further includes a plurality of other of the circuits coupled together to form a multiplier circuit. Those skilled in the art will readily perceive other highly advantageous applications for the logic gates of the present invention. The present invention fully encompasses all applications.

The present invention further provides a multiplier circuit, including a summer having at least two inputs with corresponding weights, the inputs corresponding to bits of a multiplicand, the weights based on a multiplier, the summer generating a weighted sum of the multiplicand. The weighted sum represents the result of a multiplication of the multiplier and the multiplicand and is analog in nature. A digital equivalent of the weighted sum may be derived by either successive comparisons with known analog levels (thereby producing a succession of result bits) or by converting the analog weighted sum to a digital number in an analog-to-digital (A/D) converter. The weights are preferably created by bit-shifting the multiplier. A bias may also be applied to the multiplier circuit to accommodate equations of the type: A×B+C; called inner product or multiply accumulate.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 3A, 3B and 3C illustrate schematic representations of weights and varying threshold values for the logic gate of FIG. 1 with fan-ins of three, five and seven, respectively;

FIGS. 4A, 4B and 4C illustrate schematic representations of weights and fixed threshold values for the logic gate of FIG. 1 with fan-ins of three, five and seven, respectively;

DETAILED DESCRIPTION

Figure 1:
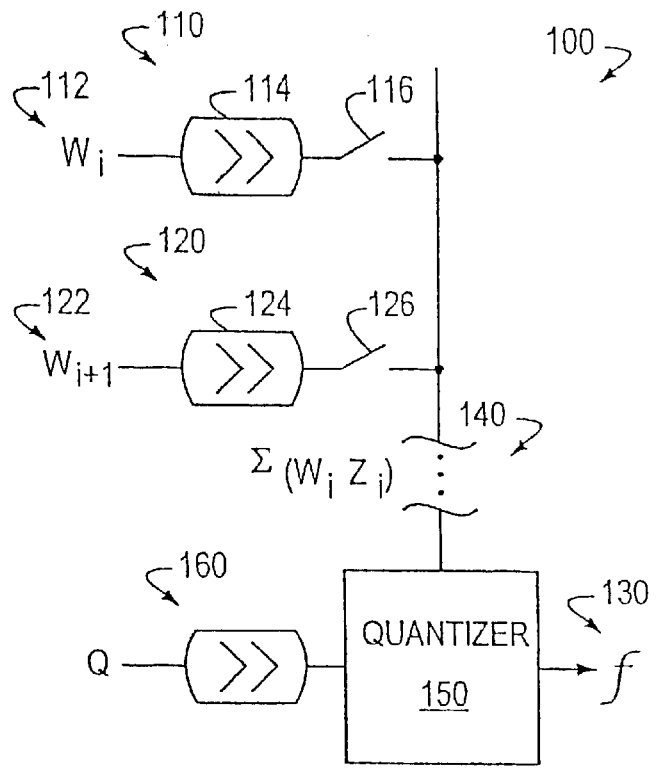
FIG. 1 illustrates an embodiment of a logic gate constructed according to the principles of the present invention.

Referring initially to FIG. 1, illustrated is an embodiment of a logic gate 100 constructed according to the principles of the present invention. The logic gate 100 includes a summer 140, having first and second binary inputs 110, 120 with corresponding first and second discrete weights 112, 122. The summer 140 generates a weighted sum of first and second input binary digits at the first and second binary inputs 110, 120, respectively. The logic gate 100 further includes a quantizer 150, coupled to the summer 140. The quantizer 150 generates an output binary digit at a binary output 130 thereof that is a function of the weighted sum.

In the illustrated embodiment, the logic gate 100 still further includes a threshold input 160 that provides a threshold number to the quantizer 150, which is subtracted from the weighted sum. The output binary digit is, therefore, a function of a relationship between the weighted sum and the threshold number. The logic gate 100 may thus be reconfigured to provide different logic functions by changing the values of the first and second discrete weights 112, 122, the value of the threshold input 160 or both.

In the illustrated embodiment, the first and second binary inputs 110, 120 contain first and second current sources 114, 124, respectively. The first and second binary inputs 110, 120 further contain first and second switches 116, 126, respectively, coupled to the first and second current sources 114, 124. The first and second current sources 114, 124 produce substantially constant first and second electrical currents, respectively, corresponding to the first and second discrete weights 112, 122. The first and second switches 116, 126 then switch the first and second electrical currents as a function of the first and second input binary digits 110, 120, respectively.

In the illustrated embodiment, with the first and second discrete weights 112, 122 set at a current corresponding to the number "1" and the threshold number 160 set at a current corresponding to the number "0.5," the logic gate 100 functions as a conventional OR gate.

The logic gate 100 operates as follows. If the first and second input binary digits are both zero, the first and second switches 116, 126 are off and a current in the summer 140 is substantially zero. Since the threshold number is set at "0.5," the quantizer 150 provides a zero to the binary output 130. If, however, either the first or second input binary digit is one, one of the first or second switches 116, 126 turns on, providing the summer 140 with a current substantially corresponding to the number "1." Since the one unit of current is greater than the threshold of "0.5," the quantizer 150 provides a one to the binary output 130. If both the first and second input binary digits are one, then both the first and second switches 116, 126 turn on, providing the summer 140 with a current substantially corresponding to the number "2." In this case, the quantizer 150 also provide a one to the binary output 130, the logic gate 100 thus functioning as an OR gate.

Of course, the threshold number may be modified as required by changing the threshold input. For example, the threshold number may be set at "1.5" to enable the logic gate 100 to perform an AND function. The quantizer 150 then provides a one to the binary output 130 only when a current corresponding to more than "1.5" appears at the summer 140.

Figure 2:
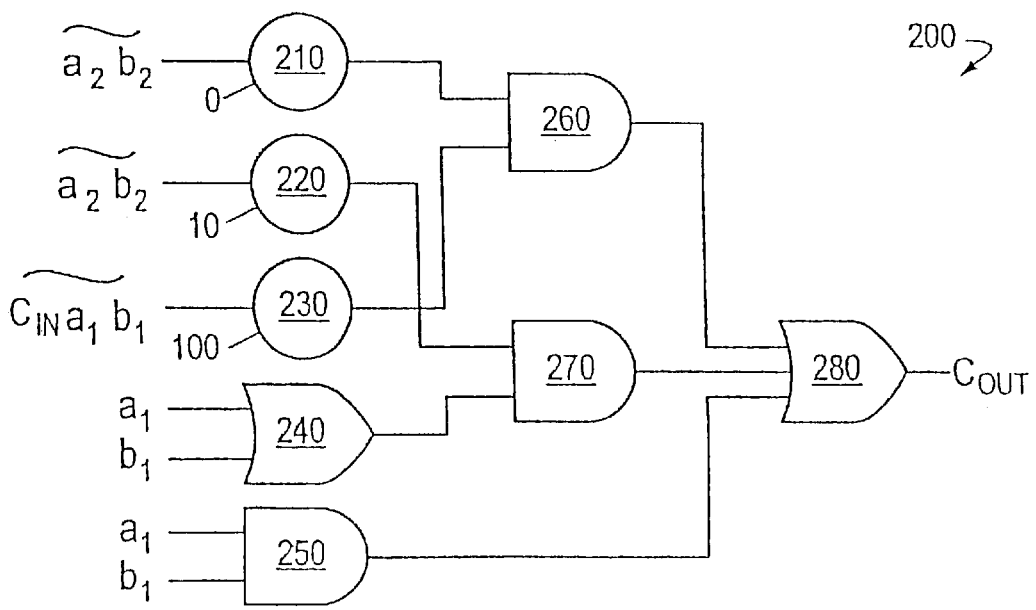
FIG. 2 illustrates an embodiment of a carry bit generating circuit constructed according to the present invention.

Turning now to FIG. 2, illustrated is an embodiment of a carry bit generating circuit, generally designated 200, constructed according to the present invention. The carry bit generating circuit 200 may be employed as part of a half or full adder and takes advantage of the logic gates of the type illustrated in FIG. 1 and is illustrated as one type of a circuit for generating an adder output bit from adder input bits.

The carry bit generating circuit 200 derives a carry out bit (one type of adder output bit) from a carry in bit and first and second addend and augend bits (types of adder input bits). If the carry bit generating circuit 200 is employed as part of a larger logic circuit (such as may occur in a multiplier circuit), the addend or augend bits may represent sums generated by logic circuits located upstream of the carry bit generating circuit 200.

The illustrated embodiment of the carry bit generating circuit 200 includes a first logic gate 210 that generates a first intermediate bit based on a comparison between a concatenation of the second addend and augend bits $a_2$, $b_2$ and zero. In other words, the second addend and augend bits $a_2$, $b_2$ are concatenated into a string. For the sake of simplicity, the second addend and augend bits $a_2$, $b_2$ are illustrated as being provided as a single input to the first logic gate 210. In practice, the second addend and augend bits $a_2$, $b_2$ are provided at separate inputs (as is illustrated with respect to the logic gate 100 of FIG. 1). The concatenation of the second addend and augend bits $a_2$, $b_2$ is compared with zero in the first logic gate 210 to determine whether or not the concatenation exceeds zero. If so, the first logic gate 210 generates a one as a first intermediate bit. If not, the first logic gate 210 generates a zero as a first intermediate bit.

The carry bit generating circuit further includes a second logic gate 220 that generates a second intermediate bit based on a comparison between the concatenation of the second addend and augend bits $a_2$, $b_2$ and two (as with the logic gate 210, the second addend and augend bits $a_2$, $b_2$ are illustrated as being provided as a single input for simplicity's sake). In other words, the concatenation that was employed in a comparison with zero in the first logic gate 210 is likewise compared with two in the second logic gate 220 to determine whether or not the concatenation exceeds two. If so, the second logic gate 220 generates a one as a second intermediate bit. If not, the second logic gate 210 generates a zero as a second intermediate bit.

The carry bit generating circuit 200 further includes a third logic gate 230 that generates a third intermediate bit based on a comparison between a concatenation of the first addend and augend bits $a_1$, $b_1$ and the carry in bit and four (again, as with the logic gate 210, the second addend and augend bits $a_2$, $b_2$ and the carry in bit are illustrated as being provided as a single input for simplicity's sake). In other words, the first addend and augend bits $a_1$, $b_1$ and the carry in bit are concatenated into a string. This concatenation is then compared with four in the third logic gate 230 to determine whether or not the concatenation exceeds four. If so, the third logic gate 230 generates a one as a third intermediate bit. If not, the third logic gate 230 generates a zero as a third intermediate bit.

The carry bit generating circuit 200 further includes a first OR gate 240 that generates a fourth intermediate bit from the first addend and augend bits $a_1$, $b_1$. If either or both of the first addend and augend bits $a_1$, $b_1$ is one, the first OR gate 240 generates a one as a fourth intermediate bit; otherwise, the first OR gate 240 generates a zero as a fourth intermediate bit.

The carry bit generating circuit 200 further includes a first AND gate 250 that generates a fifth intermediate bit from the first addend and augend bits $a_1$, $b_1$. If both of the first addend and augend bits $a_1$, $b_1$ are one, the first AND gate 250 generates a one as a fifth intermediate bit; otherwise, the first AND gate 250 generates a zero as a fifth intermediate bit.

The carry bit generating circuit 200 further includes a second AND gate 260. The second AND gate 260 is coupled to the first and third logic gates 210, 230 and generates a sixth intermediate bit based on the first and third intermediate bits. If the first and third intermediate bits are both one, the second AND gate 260 generates a one as a sixth intermediate bit. Otherwise, the second AND gate 260 generates a zero as a sixth intermediate bit.

The carry bit generating circuit 200 further includes a third AND gate 270. The third AND gate 270 is coupled to the second logic gate 220 and the first OR gate 240. The third AND gate 270 generates a seventh intermediate bit based on the first intermediate bit and the fourth intermediate bit. If the first intermediate bit and the fourth intermediate bit are one, the third AND gate 270 generates a one as a seventh intermediate bit. Otherwise, the third AND gate 270 generates a zero as a seventh intermediate bit.

Finally, the carry bit generating circuit 200 includes a second OR gate 280 that is coupled to the second AND gate 260, the third AND gate 270 and the first AND gate 250. The second OR gate 280 generates the carry out bit based on the sixth, seventh and fifth intermediate bits. If any one of the sixth, seventh and fifth intermediate bits is one, the second OR gate 280 generates a one as a carry out bit. Otherwise, the second OR gate 280 generates a zero as a carry out bit.

Those skilled in the art will note two aspects of the carry bit generating circuit 200 of FIG. 2. First, the carry bit generating circuit 200 produces a carry out bit that is appropriate to the values of the incoming addend, augend and carry in bits. Second, the carry bit generating circuit 200 involves only three layers of logic. The unique architecture and characteristics of the first, second and third logic gates 210, 220, 230, not only can possibly accommodate greater numbers of incoming addend and augend bits into larger logic gates without increasing the number of layers of logic, but also can yield a reduction in logic layers over the prior art.

The following discussion introduces carry-generate and carry-propagate bits as employed in certain adders. Those skilled in the art will understand such bits. However, for a greater understanding of their derivation, see V. Beiu and J. Taylor, *On the Circuit Complexity of Sigmoid Feedforward Neural Networks*, Neural Networks, Vol. 9, No. 7, 1996, which is incorporated herein by reference.

At this point, it is instructive to set forth a method for obtaining the weights to be employed in a given logic gate, such as the logic gate 100 of FIG. 1. It has been found that the following Equations (1), (2) and (3) may be employed to choose weights corresponding to incoming carry-generate ($v_{\Delta/2}$ for $g_i$) and carry-propagate ($w_{\Delta/2}$ for $p_i$) bits, respectively, and threshold values ($t_{\Delta+2}$) for a logic gate having a given fan-in:

$$v_{\Delta/2} = 1 + \sum_{i=0}^{\Delta/2-1} v_i + \sum_{i=0}^{\Delta/2-1} w_i \qquad (1)$$

$$w_{\Delta/2} = \sum_{i=0}^{\Delta/2-1} v_i \quad t_{\Delta+2} = -v_{\Delta/2} \qquad (2)$$

$$= -1 - \sum_{i=0}^{\Delta/2-1} v_i - \sum_{i=0}^{\Delta/2-1} w_i \qquad (3)$$

wherein $w_0=0$, $v_0=1$, $w_1=1$ and $v_1=2$. One of the advantages of the Equations (1), (2) and (3) is that the weights and threshold values allow the logic gates to be used in any layer of an adder (thus not restricting the logic gates to use in only the first layer of the adder, which is a significant limitation of the V. Beiu article cited above and incorporated herein).

Turning now to FIGS. 3A, 3B and 3C, illustrated are schematic representations of weights and varying threshold values for the logic gate 100 of FIG. 1 with fan-ins of three, five and seven, respectively. The weights ($v_{\Delta/2}$ and $w_{\Delta/2}$) and threshold values ($t_{\Delta+2}$) were generated in accordance with the Equations (1), (2) and (3) set forth above, with the initial conditions $w_0=0$, $v_0=1$, $w_1=1$ and $v_1=2$.

In FIG. 3A, the gate 100 has three inputs 320, 310, 300, corresponding to carry-generate bit $g_1$, carry-propagate bit $p_1$ and carry-generate bit $g_0$, respectively. Those skilled in the art will realize that the weight $v_0$ associated with the carry-propagate bit $p_0$ always equals 0, so the gate 100 does not need to provide an input for it. The weights corresponding to these inputs 320, 310, 300 are "2," "1" and "1," respectively. In addition, the carry bit generating circuit 200 is illustrated as having a threshold input 390 having a corresponding weight of "−2."

In FIG. 3B, the gate 100 has five inputs 340, 330, 320, 310, 300 corresponding to carry-generate bit $g_2$, carry-propagate bit $p_2$, carry-generate bit $g_1$, carry-propagate bit $p_1$ and carry-generate bit $g_0$, respectively. The weights corresponding to these inputs 340, 330, 320, 310, 300 are "5," "3," "2," "1" and "1," respectively. In addition, the gate 100 is illustrated as having a threshold input 390 having a corresponding weight of "−5."

In FIG. 3C, the gate 100 has seven inputs 360, 350, 340, 330, 320, 310, 300 corresponding to carry-generate bit $g_3$, carry-propagate bit $p_3$, carry-generate bit $g_2$, carry-propagate bit $p_2$, carry-generate bit $g_1$, carry-propagate bit $p_1$ and carry-generate bit $g_0$, respectively. The weights corresponding to these inputs 360, 350, 340, 330, 320, 310, 300 are "13," "8," "5," "3," "2," "1" and "1," respectively. In addition, the gate 100 is illustrated as having a threshold input 390 having a corresponding weight of "−13."

Those skilled in the art will perceive an advantage to having weights and threshold values as small as possible. Accordingly, FIGS. 4A, 4B and 4C, illustrate schematic representations of minimal weights and threshold values for the logic gate 100 of FIG. 1 with fan-ins of three, five and seven, respectively. In FIG. 4A, the gate 100 has three inputs 420, 410, 400, corresponding to carry-generate bit $g_1$, carry carry-propagate bit $p_1$ and carry-generate bit $g_0$, respectively. The weights corresponding to these inputs 420, 410, 400 are "2," "−1" and "1," respectively. In addition, the gate 100 is illustrated as having a threshold input 490 having a corresponding weight of "−1."

In FIG. 4B, the gate 100 has five inputs 440, 430, 420, 410, 400 corresponding to carry-generate bit $g_2$, carry-propagate bit $p_2$, carry-generate bit $g_1$, carry-propagate bit $p_1$ and carry-generate bit $g_0$, respectively. The weights corresponding to these inputs 440, 430, 420, 410, 400 are "5," "−3," "2," "−1" and "1," respectively. In addition, the gate 100 is illustrated as having a threshold input 490 having a corresponding weight of "−1."

In FIG. 4C, the gate 100 has seven inputs 460, 450, 440, 430, 420, 410, 400 corresponding to carry-generate bit $g_3$, carry-propagate bit $p_3$, carry-generate bit $g_2$, carry-propagate bit $p_2$, carry-generate bit $g_1$, carry-propagate bit $p_1$ and carry-generate bit $g_0$, respectively. The weights corresponding to these inputs 460, 450, 440, 430, 420, 410, 400 are "13," "−8," "5," "−3," "2," "−1" and "1," respectively. In addition, the gate 100 is illustrated as having a threshold input 490 having a corresponding weight of "−1."

Figure 5:
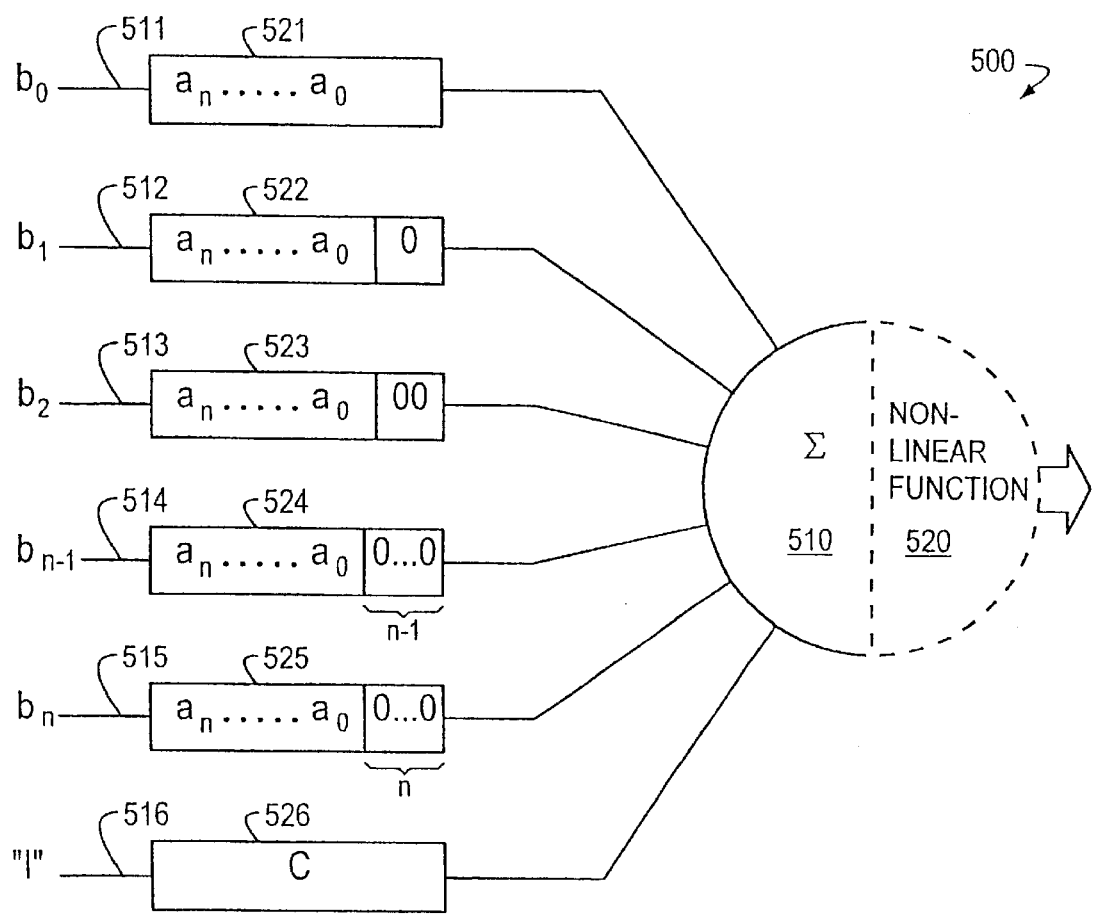
FIG. 5 illustrates an embodiment of a portion of a multiplier circuit constructed according to the present invention.

Turning now to FIG. 5, illustrated is an embodiment of a portion of a multiplier circuit, generally designated 500, constructed according to the present invention. The multiplier 500 primarily includes a summer 510 (symbolized by a "Σ") and may, in some embodiments, further include a quantizer 520 (a broken line signifies the optionality of the quantizer 520). The summer 510 has at least two inputs 511, 512 (513 . . . 514, 515) that correspond to bits $b_0, b_1$ ($b_2 \ldots b_{n-1}, b_n$) of a multiplier. The multiplier 500 may be of any width or may be packed (advantageously provided with interspersed zeros to separate individual multipliers packed therein).

Each of the at least two inputs 511, 512 (513 . . . 514, 515) further has corresponding weights 521, 522 (523 . . . 524, 525). The weights correspond to bits $a_0, a_1$ ($a_2 \ldots a_{n-1}, a_n$) of a multiplicand. As with the multiplier, the multiplicand may be of any width or may be packed. As illustrated, the weights 521, 522 (523 . . . 524, 525) are bit-shifted versions of the full multiplicand (illustrated in FIG. 5 by appending a progressing number of zeros to the full multiplicand).

From this point, the multiplier circuit 500 functions like the logic gate 100 of FIG. 1. The weights 521, 522 (523 . . . 524, 525) can be currents of appropriate magnitude, provided to the summer 510 as a function of the state of the corresponding at least two inputs 511, 512 (513 . . . 514, 515). The summer 510 generates a weighted sum of the bits $b_0, b_1, b_2 \ldots b_{n-1}, b_n$ (which amounts to multiple addition of the bits $b_0, b_1, b_2 \ldots b_{n-1}, b_n$ with the bits $a_0, a_1, a_2 \ldots a_{n-1}, a_n$) and provides an analog signal that has a current value equaling the weighted sum. If the weights are embodied in currents of given magnitudes, the summer 510 generates a current having a magnitude substantially equal to the weighted sum of the bits $b_0, b_1, b_2 \ldots b_{n-1}, b_n$. As previously described, a digital equivalent of the current (the weighted sum) may be derived by either successive comparisons with known analog levels, perhaps provided by way of a nonlinear function incorporated into the quantizer 520 (thereby producing a corresponding succession of result bits) or by converting the analog weighted sum to a digital number in an A/D converter (not shown).

The quantizer 520 (which preferably embodies a nonlinear function) receives the weighted sum and provides a signal representing one bit of the result of a multiplication of the multiplicand and the multiplier.

FIG. 5 further illustrates a further input 516 that allows a bias 526 to be provided to the multiplication. The bias 526 permits the multiplier circuit 500 to calculate functions of the type A×B+C, where C is the bias. To activate the bias 526, a one is applied at the further input 516, as shown.

Figure 6:
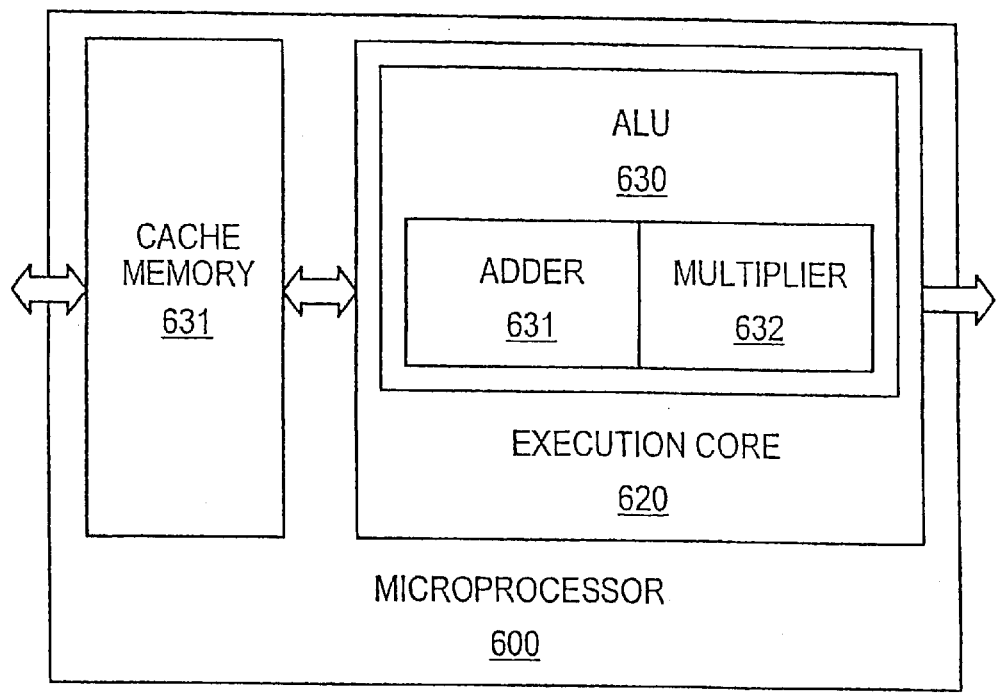
FIG. 6 illustrates a microprocessor employing the gate of FIGS. 1, 3A, 3B, 3C, 4A, 4B or 4C or the circuits of FIGS. 2 or 5.

Turning now to FIG. 6, illustrated is a microprocessor 600 employing the gates of FIGS. 1, 3A, 3B, 3C, 4A, 4B or 4C (or gates of larger fan-in) or the circuits of FIGS. 2 or 5. The microprocessor 600 is illustrated as comprising a cache memory 610 for containing data, instructions or a combination thereof. An execution core 620 interacts with the cache memory 610 to draw data or instructions therefrom and to execute the instructions with respect to the data. The execution core 620 comprises an arithmetic and logic unit (ALU) 630 that actually manipulates the data in accordance with the instructions. The ALU 630 may be pipelined and may be superscalar, allowing instructions to be executed faster or in parallel, as may be advantageous in some applications. Of course, such need not be the case.

The ALU includes either or both of an adder 631 or a multiplier 632 designed to add or multiply incoming data. Both the adder 631 and the multiplier 632 contain one or more logic gates 100 as illustrated in FIGS. 1, 3A, 3B, 3C, 4A, 4B, 4C or one or more circuits 200, 500 as illustrated in FIGS. 2 and 5. Those skilled in the art will readily understand, however, that the logic gate 100 and circuits 200, 500 of the present invention may be employed to advantage in other circuitry within a microprocessor. Further, the logic gate 100 and circuits 200, 500 of the present invention may be employed in other processing units that are not microprocessors.

Figure 7:
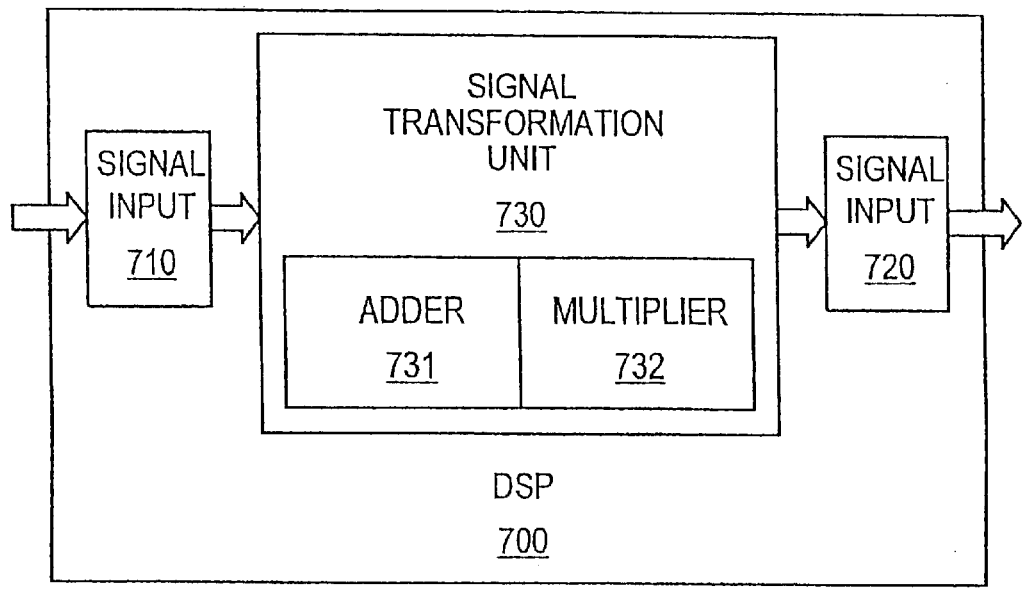
FIG. 7 illustrates a digital signal processor (DSP) employing the gate of FIGS. 1, 3A, 3B, 3C, 4A, 4B or 4C or the circuits of FIGS. 2 or 5.

Turning now to FIG. 7, illustrated is a digital signal processor (DSP) 700 employing the gate 100 of FIGS. 1, 3A, 3B, 3C, 4A, 4B or 4C (or gates of larger fan-in) or the circuits of FIGS. 2 or 5. A DSP is, in essence, a microprocessor that is optimized to handle data that streams in real time (a signal). The signal may be a sound, a video or any other data stream. Accordingly, the DSP 700 is illustrated as comprising a signal input 710 and a signal output 720. The signal input 710 receives either digital data representing a signal or, if equipped with an analog-to-digital converter, receives analog data representing the signal. Likewise, the signal input 720 can produce either digital data representing a transformed version of the signal or, if equipped with a digital-to-analog converter, analog data representing the transformed version of the signal.

Interposed between the signal input 710 and the signal output 720 is a signal transformation unit 730 that transforms the signals passing therethrough. Transformations carried out in the signal transformation unit often involve addition or multiplication operations (in fact, one can think of a signal transformation unit as a microprocessor). Thus, the signal transformation unit 730 is provided with at least an adder 731 and/or a multiplier 732 designed to add or multiply portions of an incoming signal. Both the adder(s) and multiplier(s) 731 and the multiplier 732 contain one or more logic gates 100 as illustrated in FIGS. 1, 3A, 3B, 3C, 4A, 4B, 4C or one or more circuits 200, 500 as illustrated in FIGS. 2 and 5. Those skilled in the art will readily understand, however, that the logic gate 100 and circuits 200, 500 of the present invention may be employed to advantage in other circuitry within a DSP. Further, the logic gate 100 and circuits 200, 500 of the present invention may be employed in other DSP that are not microprocessor-based.

From the above, it is apparent that the present invention provides a circuit and method for deriving an adder output bit from adder input bits, a multiplier circuit, a method of multiplying and a microprocessor and DSP employing the circuit or the method. In one embodiment, the circuit includes: (1) first, second and third logic gates that generate intermediate bits based on threshold comparisons of concatenations of ones of the adder input bits and (2) combinatorial logic that generates the adder output bit from the intermediate bits. In one embodiment, the multiplier includes a summer having at least two inputs with corresponding weights, the inputs corresponding to bits of a multiplicand, the weights based on a multiplier, the summer generating a weighted sum of the multiplicand that represents a multiplication of the multiplicand and the multiplier.

Although the present invention has been described in detail, those skilled in the art should understand that they can make various changes, substitutions and alterations herein without departing from the spirit and scope of the invention in its broadest form.

What is claimed is:

1. A circuit for deriving an adder output bit from adder input bits, comprising:
    first, second and third threshold gates that generate intermediate bits based on threshold comparisons of concatenations of said adder input bits; and
    combinatorial boolean logic that employs said intermediate bits to generate said adder output bit; wherein said combinatorial boolean logic comprises first and second AND gates and an OR gate coupled to outputs thereof.

2. The circuit as recited in claim 1 wherein said adder output bit is selected from the group consisting of:
    a carry out bit,
    a carry-generate bit, and
    a carry-propagate bit.

3. The circuit as recited in claim 1 wherein said adder input bits are selected from the group consisting of:
    a carry in bit,
    first and second addend and augend bits,
    first and second carry-generate bits, and
    first and second carry-propagate bits.

4. The circuit as recited in claim 1 wherein said first threshold logic gate generates a first intermediate bit based on a comparison between a concatenation of ones of said adder input bits and zero.

5. The circuit as recited in claim 1 wherein said second threshold logic gate generates a second intermediate bit based on a comparison between a concatenation of ones of said adder input bits and two.

6. The circuit as recited in claim 1 wherein said third threshold logic gate generates a third intermediate bit based on a comparison between a concatenation of ones of said adder input bits and four.

7. The circuit as recited in claim 1 wherein said combinatorial boolean logic generates said adder output bit from ones of said adder input bits.

8. A circuit for deriving an adder output bit from adder input bits, comprising:
    first, second and third threshold logic gates that generate intermediate bits based on threshold comparisons of concatenations of said adder input bits, each of said first, second and third logic threshold gates having:
        a summer, having at least two binary inputs with corresponding discrete weights, that generates a weighted sum of input binary digits presented at said at least two binary inputs, and
        a quantizer, coupled to said summer, that generates an output binary digit at a binary output thereof that is a function of said weighted sum; and
    combinatorial boolean logic that employs said intermediate bits to generate said adder output bit.

9. The circuit as recited in claim 8 wherein said discrete weights are integer multiples of a predetermined number.

10. The circuit as recited in claim 8 wherein each of said at least two binary inputs comprises:
    a current source capable of producing a substantially constant electrical current corresponding to a particular discrete weight; and
    a switch, coupled to said current source, that switches said electrical current as a function of a corresponding particular input binary digit.

11. The circuit as recited in claim 8 further comprising a threshold input that provides a current that represents a threshold number to said quantizer, said output binary digit being a function of a relationship between said weighted sum and said threshold number.

12. A method of deriving an adder output bit from adder input bits, comprising:
    generating intermediate bits based on threshold comparisons of concatenations of said adder input bits; and
    employing combinatorial boolean logic and said intermediate bits to generate said adder output bit;
    wherein said employing combinatorial boolean logic and said intermediate bits to generate said adder output bit is carried out by first and second AND gates and an OR gate coupled to outputs thereof.

13. The method as recited in claim 12 wherein said adder output bit is selected from the group consisting of:
    a carry out bit,
    a carry-generate bit, and
    a carry-propagate bit.

14. The method as recited in claim 12 wherein said adder input bits are selected from the group consisting of:
   a carry in bit,
   first and second addend and augend bits,
   first and second carry-generate bits, and
   first and second carry-propagate bits.

15. The method as recited in claim 12 wherein said generating said intermediate bits comprises generating a first intermediate bit based on a comparison between a concatenation of ones of said adder input bits and zero.

16. The method as recited in claim 12 wherein said generating said intermediate bits comprises generating a second intermediate bit based on a comparison between a concatenation of ones of said adder input bits and two.

17. The method as recited in claim 12 wherein said generating said intermediate bits comprises generating a third intermediate bit based on a comparison between a concatenation of ones of said adder input bits and four.

18. The method as recited in claim 12 wherein said employing combinatorial boolean logic and said intermediate bits to generate said adder output bit comprises generating said adder output bit from ones of said adder input bits.

19. A method of deriving an adder output bit from adder input bits, comprising:
   generating intermediate bits based on threshold comparisons of concatenations and said adder input bits, wherein said generating said intermediate bit comprises:
      generating a weighted sum of input binary digits presented at least two binary inputs, and
      generating an output binary digit at a binary output thereof that is a function of said weighted sum; and
   employing combinatorial boolean logic and said intermediate bits to generate said adder output bit.

20. The method as recited in claim 19 wherein said discrete weights are integer multiples of a predetermined number.

21. The method as recited in claim 19 wherein each of said at least two binary input comprises:
   a current source capable of producing a substantially constant electrical current corresponding to a particular discrete weight; and
   a switch, coupled to said current source, that switches said electrical current as a function of a corresponding particular input binary digit.

22. The method as recited in claim 19 further comprising providing a current that represents a threshold number, said output binary digit being a function of a relationship between said weighted sum and said threshold number.

23. A circuit for deriving a carry out bit from a carry in bit and first and second addend and augend bits, comprising:
   a first logic gate that generates a first intermediate bit based on a comparison between a concatenation of said second addend and augend bits and zero;
   a second logic gate that generates a second intermediate bit based on a comparison between said concatenation of said second addend and augend bits and two;
   a third logic gate that generates a third intermediate bit based on a comparison between a concatenation of said first addend and augend bits and said carry in bit and four;
   a first OR gate that generates a fourth intermediate bit based on said first addend and augend bits;
   a first AND gate that generates a fifth intermediate bit based on said first addend and augend bits;
   a second AND gate that generates a sixth intermediate bit based on said first and third intermediate bits;
   a third AND gate that generates a seventh intermediate bit based on said second and fourth intermediate bits; and
   a second OR gate that generates said carry out bit based on said sixth, seventh and fifth intermediate bits.

24. The circuit as recited in claim 23 wherein each of said first, second and third logic gates comprises:
   a summer, having at least two binary inputs with corresponding discrete weights, that generates a weighted sum of input binary digits presented at said at least two binary inputs; and
   a quantizer, coupled to said summer, that generates an output binary digit at a binary output thereof that is a function of said weighted sum.

* * * * *

UNITED STATES PATENT AND TRADEMARK OFFICE
CERTIFICATE OF CORRECTION

PATENT NO.    : 6,502,120 B2
DATED         : December 31, 2002
INVENTOR(S)   : Valeriu Beiu It is certified that error appears in the above-identified patent and that said Letters Patent is hereby corrected as shown below:

Column 9,
Line 32, delete "carry" at the end of line.

Column 13,
Line 28, "intermediate bit" should be -- intermediate bits --.
Line 40, "binary input" should be -- binary inputs --.

Signed and Sealed this

Eighth Day of July, 2003

JAMES E. ROGAN
*Director of the United States Patent and Trademark Office*